United States Patent
Shaw

(10) Patent No.: US 10,802,215 B2
(45) Date of Patent: Oct. 13, 2020

(54) OPTICAL WAVEGUIDE, CORRESPONDING COUPLING ARRANGEMENT, APPARATUS AND METHOD

(71) Applicant: STMICROELECTRONICS S.R.L., Agrate Brianza (IT)

(72) Inventor: Mark Andrew Shaw, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 15/921,374

(22) Filed: Mar. 14, 2018

(65) Prior Publication Data
US 2018/0275342 A1  Sep. 27, 2018

(30) Foreign Application Priority Data

Mar. 23, 2017 (IT) .......................... 102017000032272

(51) Int. Cl.
*G02B 6/125* (2006.01)
*G02B 6/136* (2006.01)
(Continued)

(52) U.S. Cl.
CPC .............. *G02B 6/125* (2013.01); *G02B 6/136* (2013.01); *G02B 6/2821* (2013.01); *G02B 6/30* (2013.01);
(Continued)

(58) Field of Classification Search
CPC .......... G02B 6/125; G02B 6/136; G02B 6/30; G02B 2006/12061; G02B 6/2821; G02B 6/2852
See application file for complete search history.

(56) References Cited

U.S. PATENT DOCUMENTS 8,903,205 B2 * 12/2014 Koos ...................... G02B 6/30
  385/14
9,405,066 B2  8/2016 Mahgerefteh et al.
(Continued)

FOREIGN PATENT DOCUMENTS

EP  0 292 331 A2  11/1988

OTHER PUBLICATIONS

Barwicz et al., "Low-Cost Interfacing of Fibers to Nanophotonic Waveguides: Design for Fabrication and Assembly Tolerances," *IEEE Photonics Journal* 6(4), 2014, 19 pages.
(Continued)

*Primary Examiner* — John Bedtelyon
(74) *Attorney, Agent, or Firm* — Seed Intellectual Property Law Group LLP

(57) ABSTRACT

An optical waveguide includes a glass waveguide body and a waveguide core through which optical radiation propagates. The waveguide core includes: a body portion extending within the waveguide body, a coupling portion extending at the surface of the waveguide body, and an S-bent intermediate portion coupling the body portion and the coupling portion. An optical coupling arrangement (e.g., for coupling one or more optical fibers to a silicon photonics device) includes one such optical waveguide and a second optical waveguide including a respective waveguide body and one or more waveguide members. The second optical waveguide is coupled with the first optical waveguide with the waveguide member(s) facing the coupling portion of the first optical waveguide.

20 Claims, 4 Drawing Sheets

(51) Int. Cl.
*G02B 6/30* (2006.01)
*G02B 6/28* (2006.01)
*G02B 6/12* (2006.01)

(52) U.S. Cl.
CPC .. *G02B 6/2852* (2013.01); *G02B 2006/12061* (2013.01)

(56) References Cited

U.S. PATENT DOCUMENTS

| | | | |
|---|---|---|---|
| 10,564,354 B2 * | 2/2020 | Fortusini | G02B 6/125 |
| 2003/0081902 A1 | 5/2003 | Blauvelt et al. | |
| 2003/0086651 A1 | 5/2003 | Chang et al. | |

OTHER PUBLICATIONS

Barwicz et al., "Optical Demonstration of a Compliant Polymer Interface between Standard Fibers and Nanophotonic Waveguides," *Optical Fiber Communication Conference*, Optical Society of America, 2015, 3 pages.

Boyer et al., "Sub-Micron Bondline-Shape Control in Automated Assembly of Photonic Devices," *66th Electronic Components and Technology Conference (ECTC)*, IEEE, 2016, pp. 2257-2263.

Chiaretti et al., "Towards the Industrial Deployment of the Silicon Photonics Technology," *Bipolar/BiCMOS Circuits and Technology Meeting (BCTM)*, IEEE, 2013, pp. 135-142.

Krähenbühl et al., "High-Precision, Self-Aligned, Optical Fiber Connectivity Solution for Single-Mode Waveguides Embedded in Optical PCBs," *Journal of Lightwave Technology* 33(4):865-871, 2015.

Narasimha et al., "An Ultra Low Power CMOS Photonics Technology Platform for H/S Optoelectronic Transceivers at less than $1 per Gbps," *Optical Fiber Communication Conference*, Optical Society of America, 2010, 3 pages.

Ogura et al., "Polysilane-based 3D waveguides for optical interconnects," *Proceedings of SPIE, the International Society for Optical Engineering 6891*, Society of Photo-Optical Instrumentation Engineers, 2008, 11 pages.

Poulopoulos et al., "Angled 3D Glass-to-SiPh adiabatic coupler," *18th European Conference on Integrated Optics*, Warsaw, Poland, May 18-20, 2016, 2 pages.

Sacher et al., "Wide bandwidth and high coupling efficiency $Si_3N_4$-on-SOI dual-level grating coupler," *Optics Express* 22(9):10938-10947, 2014.

* cited by examiner

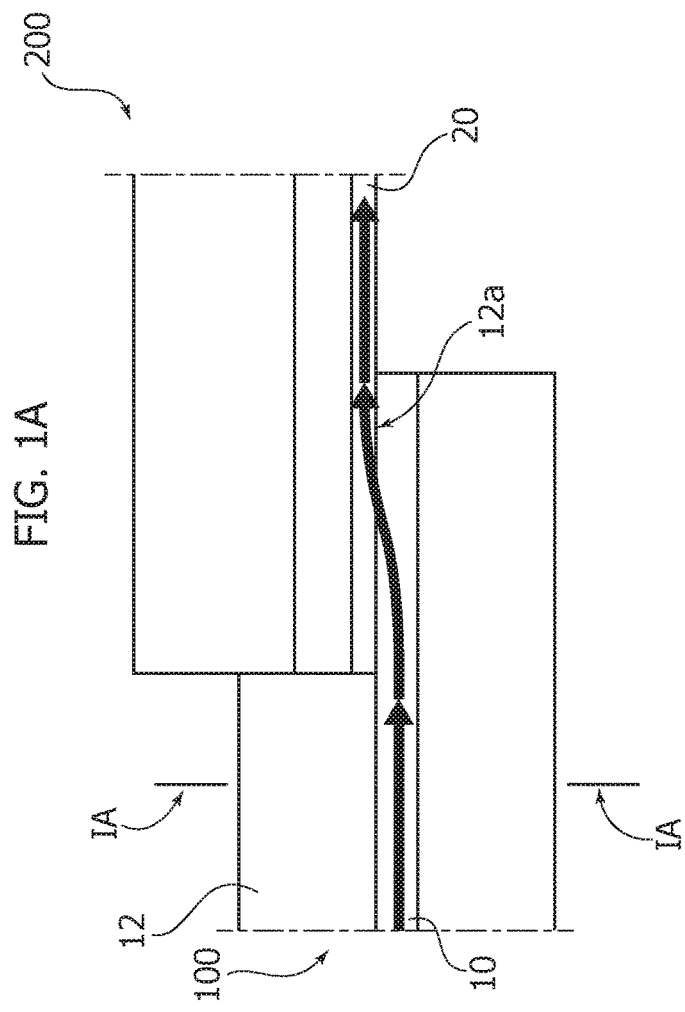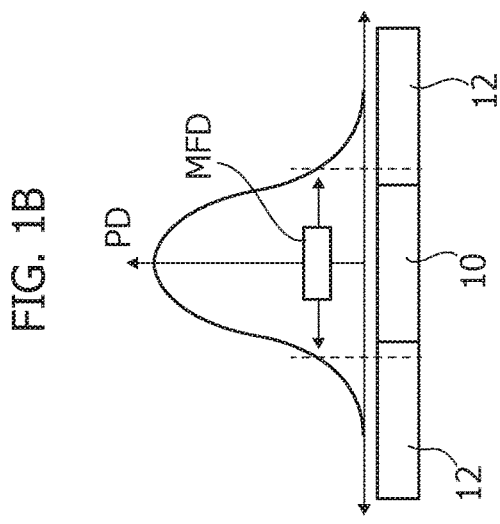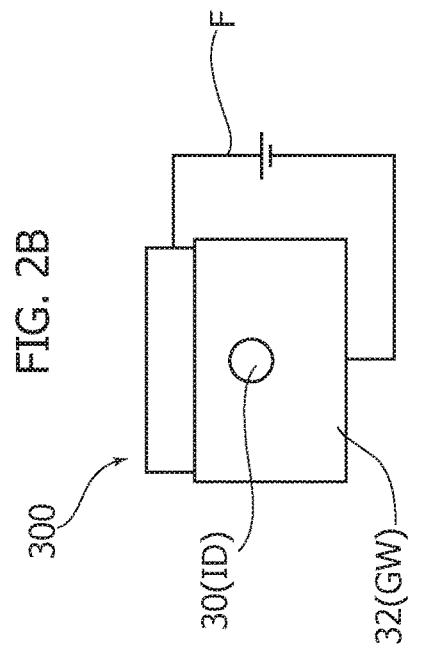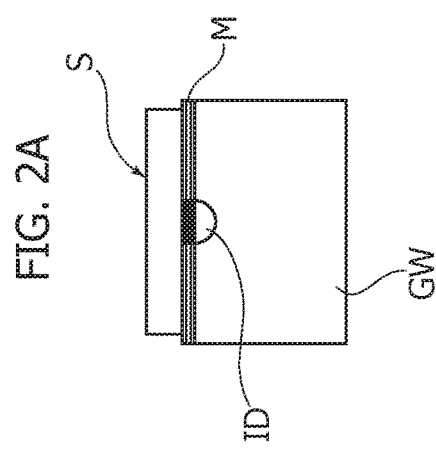

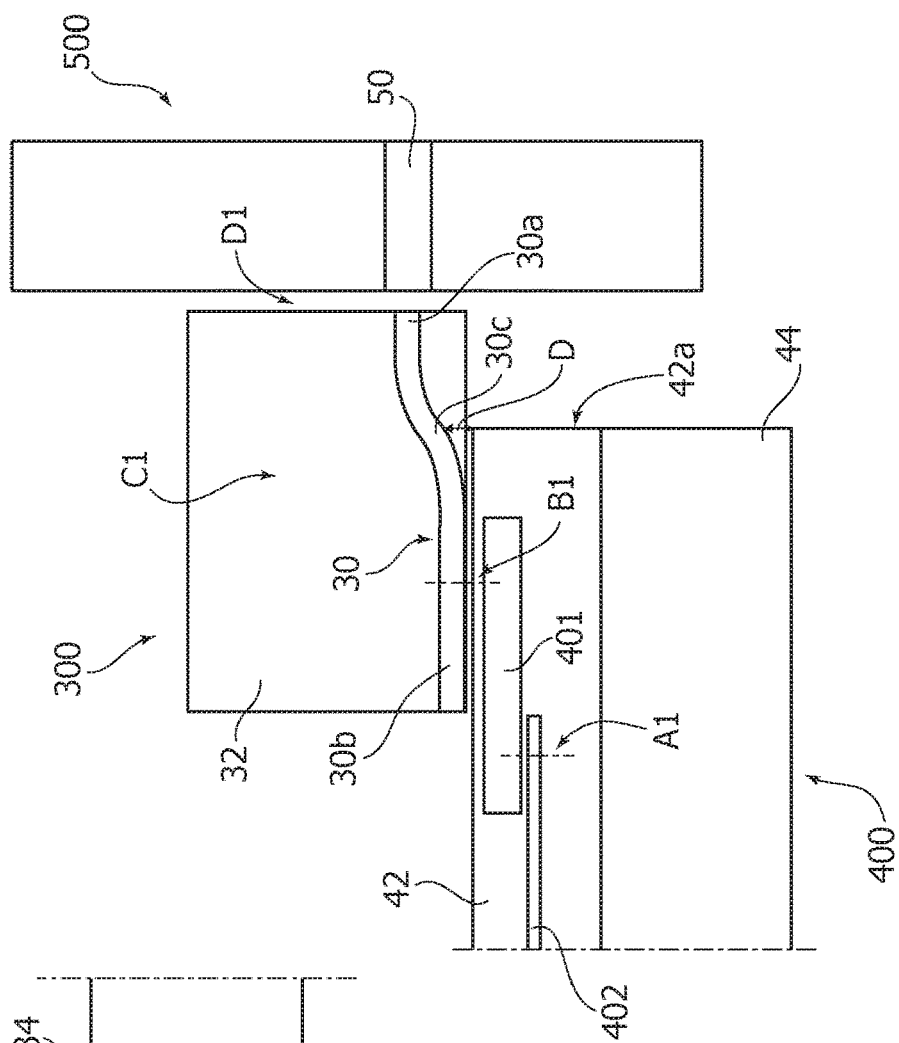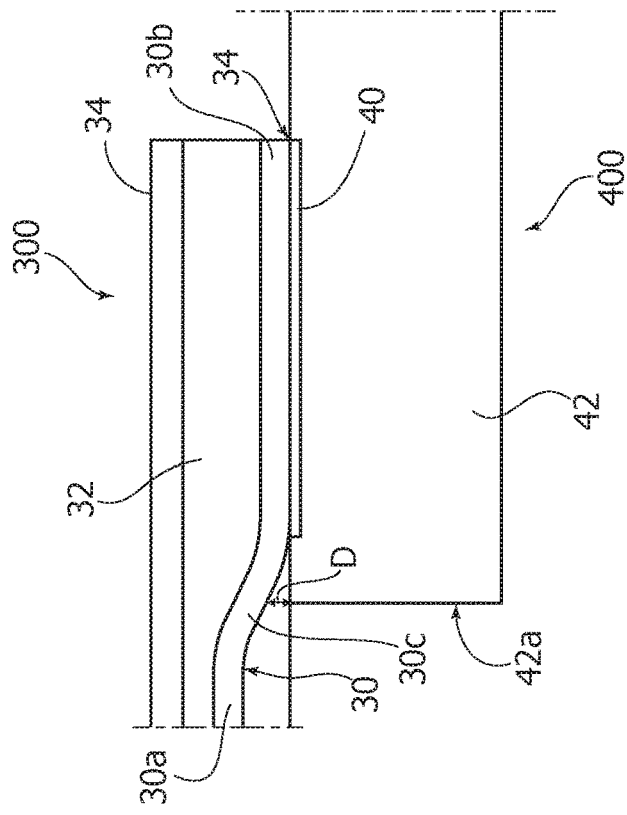

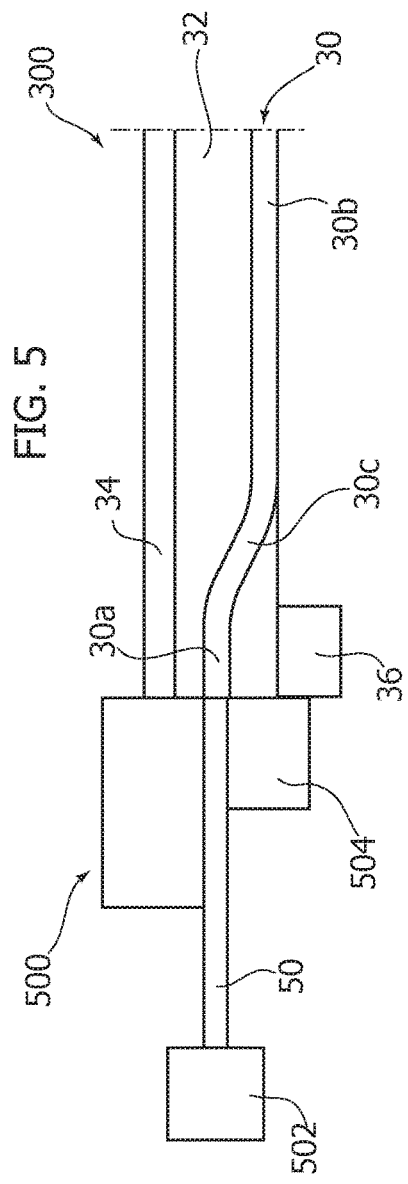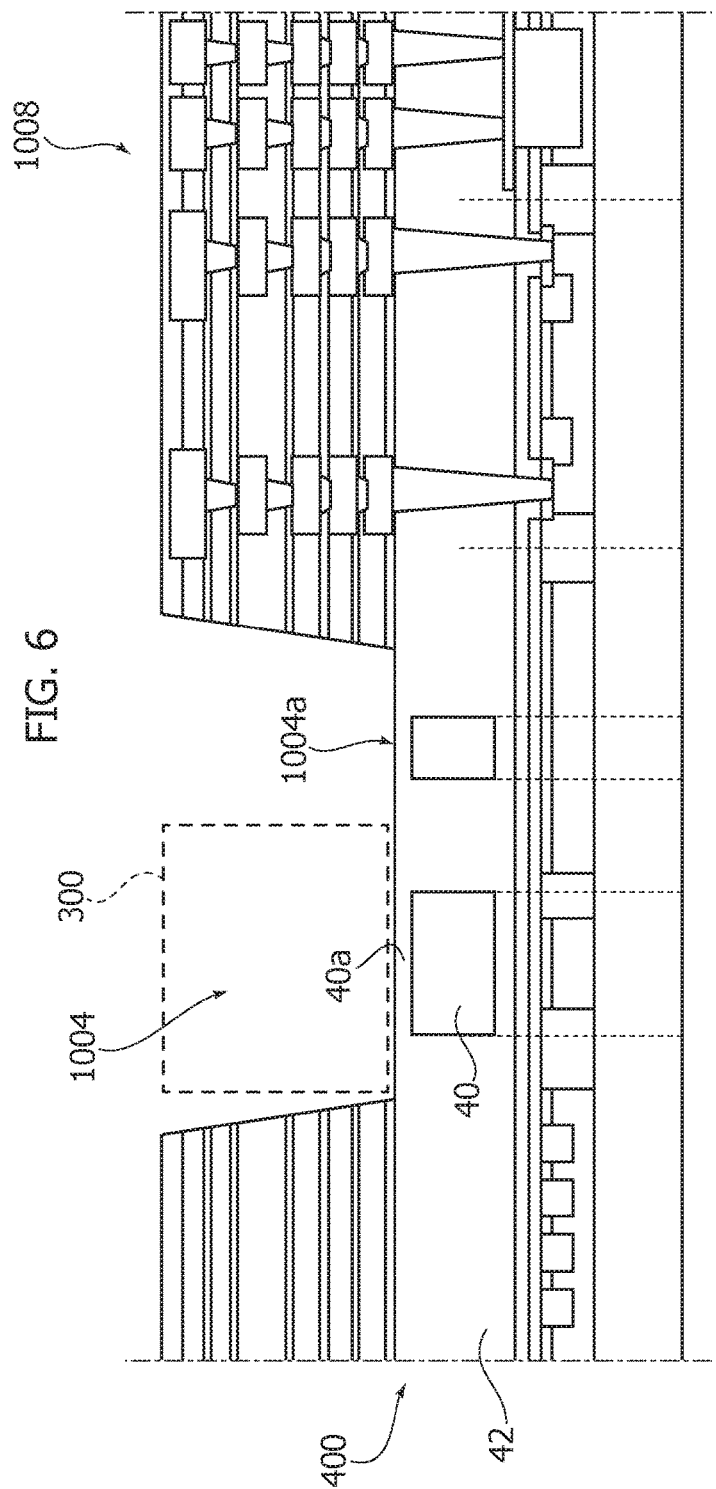

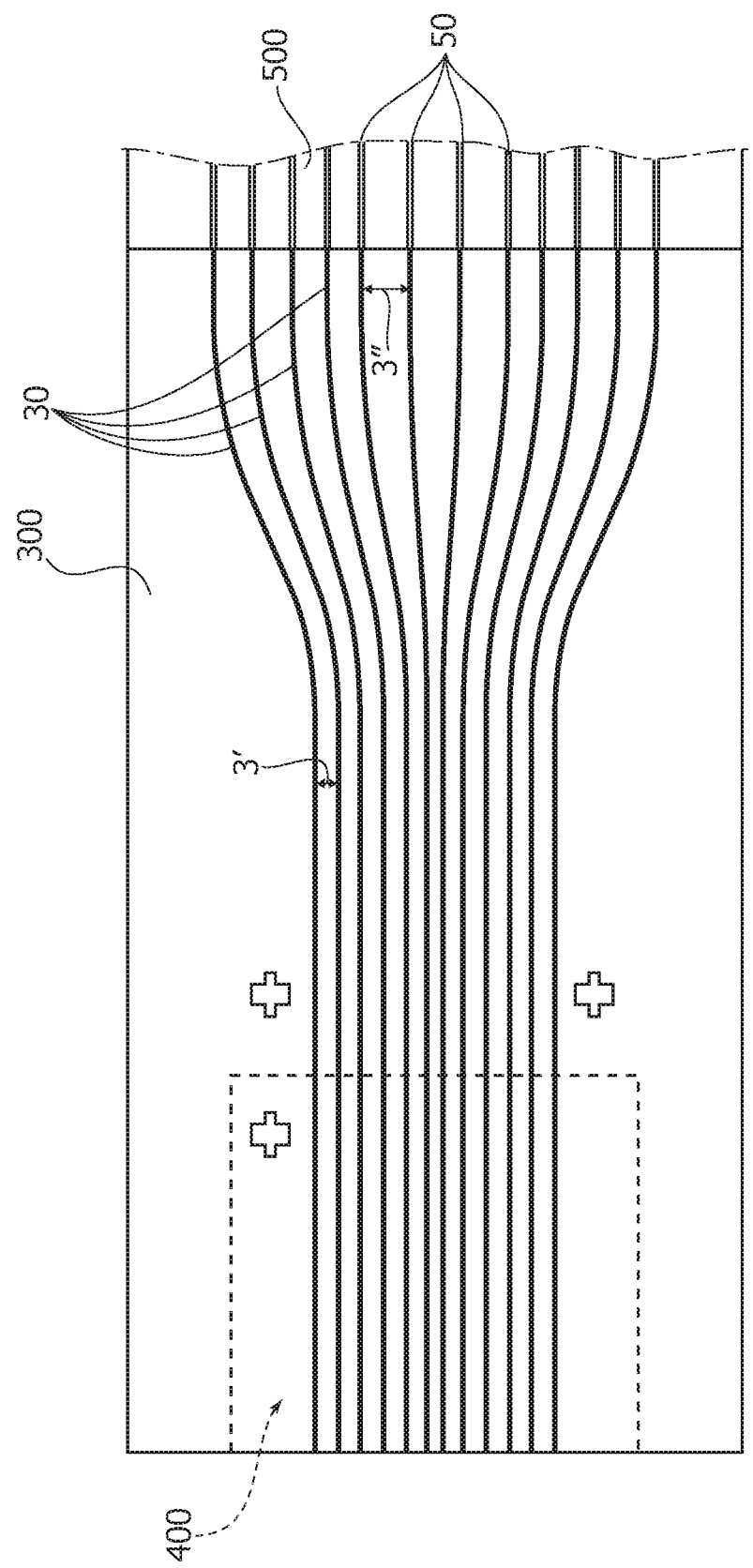

OPTICAL WAVEGUIDE, CORRESPONDING COUPLING ARRANGEMENT, APPARATUS AND METHOD

BACKGROUND

Technical Field

The description relates to optical waveguides.

One or more embodiments may apply for instance to coupling arrangements of optical waveguides, such as optical fibers.

Throughout this description, various documents will be referred to by reproducing between square parentheses (for instance [X]) a number identifying the document in a LIST OF DOCUMENTS CITED which appears at the end of the description.

Description of the Related Art

Conventional techniques which may be used to couple light into waveguides include grating coupling and edge coupling.

An example of waveguide coupling, obtained through a grating coupling technology, is shown in [1]. An example of light coupling into multiple fibers, wherein a fiber V block may be attached to a silicon photonics chip, is described in [2].

An advantage of grating couplers may lie in that light may exit from a wafer surface, and not from an edge, which facilitates wafer level testing. Grating couplers may also exhibit an advantage in being able to couple to a top surface.

Grating couplers may have one or more disadvantages.

For instance, loss over a large wavelength range may be higher away from a center design wavelength, see, e.g., [3].

Also, an, e.g., 4-lane Coarse Wavelength Division Multiplexing (CWDM4) may be derived from a PSM4 (Parallel Single Mode 4 lane) specification using, e.g., CWDM4 wavelengths: 1271 nm, 1291 nm, 1311 nm, 1331 nm. This type of module may use a single fiber input for transmission (Tx) and a single fiber for reception (Rx), both with, e.g., the 4 different "colors" (that is wavelengths) of light. Such an arrangement may provide an advantage for a customer insofar as, instead of, e.g., 4 Tx fibers and 4 Rx fibers, 8 in total, the customer may only cable two fibers maintaining the quantity, e.g., Gbits, of information transmitted.

However, due to loss in the gratings, which also may be exposed to, e.g., process variation and temperature, such an arrangement may not be suitable for broadband CWDM4 applications.

As already discussed previously, another conventional solution is represented by edge coupling. However, edge coupling may have a disadvantage in lacking wafer level testing and in optical quality edge finish being possibly required.

BRIEF SUMMARY

One or more embodiments may relate to a corresponding coupling arrangement, a corresponding apparatus (e.g., an optical connector) and a corresponding method.

One or more embodiments may involve adopting an adiabatic coupling technology for broadband coupling.

The present disclosure is directed to an optical waveguide including a waveguide body having a surface and a waveguide core that includes a first portion extending within the waveguide body along a first axis and a second portion extending within the waveguide body along a second axis, the second axis being closer to the surface of the waveguide body than the first axis. The waveguide core includes an intermediate portion between the first portion and the second portion that is curved and may be S-shaped. The first axis and the second axis are substantially parallel to each other.

BRIEF DESCRIPTION OF THE SEVERAL VIEWS OF THE DRAWINGS

One or more embodiments will now be described, by way of example only, with reference to the annexed figures, wherein:

FIG. 1A is a side view exemplary of adiabatic coupling of optical waveguides;

FIG. 1B is a diagram further illustrative of FIG. 1A;

FIGS. 2A and 2B are cross-sectional views illustrating various stages of manufacturing a waveguide using ion exchange technology, in accordance with one or more embodiments;

FIG. 3 is a side view illustrative of one or more embodiments;

FIG. 4 is a side view illustrative of one or more embodiments;

FIG. 5 a side view illustrative of one or more embodiments;

FIG. 6 a view of a device exemplary of one or more embodiments; and

FIG. 7 is a plan view illustrative of one or more embodiments.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

FIG. 1A is a representation of certain principles underlying adiabatic coupling of optical waveguides.

An electromagnetic propagation (e.g., an electromagnetic wave exemplified in FIG. 1A by arrows pointing from left to right) may take place in a waveguide 100 by being substantially confined within a waveguide core 10 due to a difference in refractive index between the core 10 and a waveguide cladding 12.

As shown in FIG. 1B (which may be seen as roughly corresponding to a notional cross-section along line IA-IA in FIG. 1A), a portion of the light in the waveguide 100 still travels in the waveguide cladding 12, with the mode field diameter, MFD, corresponding to the diameter at which the power density PD is reduced to $1/e^2$ of its peak value PD, the diameter MFD being in fact larger than the waveguide core 10 dimensions.

With the cladding 12 removed on one side of the waveguide 100, optical radiation (briefly "light") may be able to "leak" out of the waveguide 100 at a surface 12*a*. A further waveguide 200 may be arranged with a core 20 overlapping the surface 12*a* to produce a structure able to couple light between the two waveguides 100 and 200. A specific design of the two waveguides 100, 200, including width, refractive index, length, etc., may determine the efficiency of the coupling between the two waveguides 100, 200.

An example of adiabatic coupling between optical waveguides is described, e.g., in [4], where a tapered silicon waveguide is disclosed coupled to a rectangular polymer waveguide with a transition cladding provided by a bottom polymer layer and an epoxy layer used for attachment. The polymer waveguide may also include a fan out in order to increase the pitch between the waveguides, wherein a small pitch on the silicon chip may be, e.g., a 250 micron (1 micron=$10^{-6}$ m) pitch as conventionally used in fiber ribbons. In addition, changing the waveguide dimensions may further facilitate coupling to an optical fiber.

It was observed that such an approach may exhibit certain disadvantages. For example, adiabatic coupling may reveal extra propagation loss due to an abrupt refractive index change that an, e.g., polymer waveguide may "see" at, e.g., the edge of a silicon photonic chip, as exemplified in [5], e.g., due to the refractive index that changes from that of the silicon photonic chip to that of an epoxy layer at the chip edge.

It was noted that a solution to overcome this disadvantage may involve introducing a curve or bend in the receiving, e.g., polymer waveguide so that the refractive index may gradually change and at a value, e.g., >5 micron (1 micron=$10^{-6}$ m) above the edge of the chip so that no abrupt change in refractive index will be "seen" by the electromagnetic radiation.

An alternative solution to this disadvantage may include resorting to an arrangement as disclosed in [6]. In this case two glass waveguides may be produced using direct laser writing technology, and an abrupt transition may be avoided by angle polishing the glass.

It was observed the two approaches just discussed may show at least one (residual) drawback: due to bend loss of in the, e.g., polymer waveguide, the admissible radius of the bend is restricted, thus leading to larger chips.

Also, it was further observed that:
a material such as a polymer material may have a loss of 0.4 dB/cm, which may increase the overall system loss;
maintaining a bend may require precise and complex tooling;
polished direct-write waveguides may also be limited by a control of the angle, i.e., the overlap length of the two waveguides may be limited.

One or more embodiments may involve a waveguide having a S-shaped core which may be fabricated, e.g., in glass via ion exchange technology, such as the ion exchange technology available with Teem Photonics of Meylan, France.

A process of manufacturing such a waveguide through ion exchange technology, in accordance with one or more embodiments of the present disclosure, is shown in FIGS. 2A and 2B.

FIGS. 2A and 2B can be regarded as example cross sectional views of such a waveguide, namely sectional views in a plane orthogonal to the direction of propagation of optical radiation along the waveguide.

As exemplified in FIG. 2A, a metal mask M may be used to define an area of ion diffusion ID from a molten salt bath S into a glass wafer GW to form a surface channel.

As exemplified in FIG. 2B, an external electric field F may then be applied in order to "move" the ions ID deeper into the glass wafer GW to render the channel a buried channel extending within the class wafer GW.

In one or more embodiments, the ion concentration at ID may be used to, e.g., locally change the refractive index of the glass wafer, thus producing a waveguide 300 having a core 30 defined by the ion concentration ID and a cladding 32 defined by the glass wafer GW where the ion concentration is not present. This process is exemplified in FIG. 2B where the core and the cladding of the waveguide 300 thus produced are labelled 30(ID) and 32(GW), respectively, the reference to ID and GW making reference to how the core and the cladding may be obtained.

FIG. 3 exemplifies how applying such processing selectively along the length of a waveguide 300 (possibly including a substrate 34 of a known type, e.g., quartz or glass) may permit to produce an S-bend in a waveguide core 30.

In one or more embodiments, such a core 30 may thus extend:
more or less centrally of the waveguide cladding over a first portion 30*a*, as shown, e.g., in the left-hand portion of FIG. 3, which shows the core 30 positioned in a central region between opposite surfaces of the waveguide 300,
at the waveguide surface ("at" meaning either directly exposed to the waveguide surface or in proximity of the waveguide surface, e.g., covered by a thin layer) over a second portion 30*b*, e.g., a terminal coupling portion, as shown, e.g., in the right-hand portion of FIG. 3.

At the coupling portion 30*b* the waveguide 300 can thus be adiabatically coupled (possibly with a thin, e.g., epoxy layer 34 therebetween) to a further, e.g., silicon photonics waveguide 400 having a core 40 over a substrate 42. In one or more embodiments, the waveguide 400 may include, e.g., Si or SiN or be a double transition Si—SiN-polymer (see also below).

Also, in one or more embodiments, the waveguide core 30 exhibits an S-bend, namely an S-bent intermediate portion 30*c*, coupling the first portion 30*a* and the second portion 30*b*, coupling (connection) being achieved gently, that is without abrupt discontinuities. As used herein, an S-bend or S-shape refers to a curved shape that includes a first curve having a first orientation of curvature (e.g., the "downward" curved portion between the first portion 30*a* and the intermediate portion 30*c*) and a second curve having a second orientation of curvature that is opposite the first orientation of curvature (e.g., the "upward" curved portion between the intermediate portion 30*c* and the second portion 30*b*).

As exemplified in FIG. 3, in one or more embodiments, the S-bend in the waveguide core 30 may start before the end 42*a* of the, e.g., silicon chip 400 (that is, with the S-bent portion 30*c* "straddling" the end 42*a* and the portions 30*a* and 30*b* located on opposite sides of the end 42*a*, namely at the area of adiabatic coupling with the silicon chip 400 and externally of that area, respectively).

In that way the radiation in the waveguide 300 will not see any appreciable change in refractive index at the edge 42*a* of the chip due to the transition of the waveguide core 30 between a "surface" waveguide (in the portion 30*b* of adiabatic coupling) and a "buried" waveguide (in the portion 30*a*).

As exemplified, e.g., in FIGS. 3 and 4 this S-bend 30c may be produced so that—at the end edge 42a—it is at a distance D above (that is, from) the transition at the silicon chip edge, so that light travelling in the cladding 32, i.e., a residual "tail" of the power density as previously observed in FIG. 1B, is at a distance D above the transition at the silicon chip edge, that is the portion of the cladding 32 facing the silicon chip 400 at the silicon chip edge 42a. The distance D may be selected as a function of the waveguide dimensions and materials, the distance D being such that no significant portion of the light distribution is "in contact" with the silicon chip edge 42a.

In case of, e.g., a glass ion exchange waveguide, manufactured with the ion exchange method exemplified previously, coupled with, e.g., a SiN waveguide, the mode field diameter (MFD) may be about 4 micron, i.e., 2 micron radius (1 micron=$10^{-6}$) while the center of the waveguide core may reside at about 5 micron (1 micron=$10^{-6}$) from the glass waveguide surface.

A portion of the light, which may be non-negligible, thus propagates in the waveguide cladding 32: in order to facilitate avoiding losses, the distance D between the waveguide core 30 and the surface of the glass waveguide 300 at the silicon chip edge 42a may be substantially greater than the "tail" of the power density distribution, e.g., 99% of the light energy being within the glass waveguide 300 at the, e.g., silicon chip edge 42a. In one or more embodiments, the solution exemplified in FIG. 3 may also facilitate providing a change in waveguide (core) dimensions, e.g., from a first value facilitating adiabatic coupling (e.g., 4 micron–1 micron=$10^{-6}$ m) to a second value matching the mode field diameter of the optical fiber 300 (e.g., 8.7 micron–1 micron=$10^{-6}$ m), depending on fiber type.

FIG. 4 is exemplary of one or more embodiments which may adopt an S-bend coupling as discussed previously in combination with a double transition.

By way of example, FIG. 4 depicts an adiabatic coupling scheme including a SOI (Silicon On Insulator) 400 to SMF (Single Mode Fiber) 500 interface arrangement.

In FIG. 4, a waveguide 300 including an S-bent core 30 as discussed previously is shown with the "buried" portion (right hand side of waveguide 300 in FIG. 4) coupled, e.g., via butt coupling, to a single mode fiber—SMF 500 having a core 50, with the, e.g., glass/SMF interface D1 adapted to be produced (e.g., via known attachment solutions) by reducing mode mismatch.

Propagation along the waveguide 300 can occur (via the S-bent core 30) with reduced loss (e.g., glass loss, schematically designated C1), with coupling of the waveguide 300 to the waveguide 400 occurring at the "surface" portion (left hand side of waveguide 300 in FIG. 4) coupled to the waveguide 400 via an adiabatic coupling scheme.

In one or more embodiments such an adiabatic coupling may include:
a first adiabatic coupling interface B1 between the (e.g., glass ion exchange) waveguide 300 and a first waveguide portion 401, such as a SiN-waveguide member, and
a second adiabatic coupling interface A1 between the SiN-waveguide member 401 and second waveguide portion 402, such as a Si waveguide member, e.g., a SOI waveguide on a Si-substrate 44.

It will be noted that the S-bend after the adiabatic coupling interface B1 may start in proximity of, before or after, the SiN-waveguide member 401 end.

In one or more embodiments, an arrangement as exemplified in FIG. 4 may be simplified to include a single adiabatic transition/interface, e.g., directly between the SOI waveguide member 402 and the glass waveguide 30 or directly between a SiN waveguide member 401 and the glass waveguide 30, with no previous SOI waveguide coupling. Although not shown, the waveguide 300 may be attached to the waveguide 400, for example, by glue. In some embodiments, the glue has a thickness that is less than 1.5 microns over the entire coupling length. That is, the glue has a thickness less than 1.5 microns between the second portion 30b of the core 30 and the SiN waveguide member 401. The glue may have a refractive index of about 1.51.

In one or more embodiments, the fiber assembly can then be attached to a glass coupler using a standard polished V-groove assembly.

FIG. 5 is exemplary of one or more embodiments where a waveguide assembly 300 with an S-bent core 30 over an (e.g., glass) substrate 32 is coupled with a fiber assembly 500 possibly having an associated connector 502. It should be readily appreciated that the waveguide assembly 300 with an S-bent core 30 may be optically coupled to another optical device through a variety of optical coupling configurations.

FIG. 5 is exemplary of a fiber block assembly 500 which may be butt coupled (e.g., fixed with epoxy glue) to a polymer, for example. Such coupling as shown at 504 may include a support lid 36 to facilitate precise positioning.

In that way the length of polymer can be restricted to less than 5 mm-6 mm, thus reducing the overall loss.

This technology may present an advantage due to an inherent low loss of glass waveguides (e.g., smaller than 0.1 dB/cm). Glass waveguides may also present low bend loss, e.g., a bend of 3 mm or less produces negligible loss.

The waveguide assembly 300 may be positioned adjacent to the fiber block assembly 500, with an exposed surface or edge of the first portion 30a of the waveguide core 30 being aligned with a corresponding exposed surface or edge of the core 50 of the fiber block assembly 500. The first portion 30a of the waveguide core 30 is centrally positioned within the waveguide body 32, which may be, for example, a glass substrate. The support lid 36 may be attached to a surface of the waveguide body 32 (e.g., the lower surface as shown in FIG. 5), with an end surface of the support lid 36 being substantially aligned (e.g., along the vertical direction) with the end surface of the waveguide assembly 300, i.e., the end surfaces of the waveguide core 30 and of the waveguide body 32, as shown.

The support lid 36 may extend along the surface of the waveguide body 32 from the end surface of the waveguide body 32 to a position that is between the end surface of the waveguide body 32 and the second portion 30b of the waveguide core 30. Stated differently, the support lid 36 does not extend to the second portion 30b of the waveguide core 30, which is adjacent to or forms a part of the surface of the waveguide assembly 300. Instead, the support lid 36 is separated from the waveguide core 30 by at least some portion of the waveguide body 32, e.g., the glass substrate.

In some embodiments, the support lid 36 may extend from the end surface of the waveguide assembly 300 to a position that is aligned with (e.g., in the vertical direction shown in FIG. 3) the first portion 30a of the waveguide core. In other embodiments, the support lid 36 may extend from the end surface of the waveguide assembly 300 to a position that is aligned with part of the intermediate portion 30c of the waveguide core 30. That is, in some embodiments, the support lid 36 may be aligned with, for example, a first bend of the S-shaped intermediate portion 30c of the waveguide core 30.

FIG. 6 is exemplary of certain features of the so-called Back End Of Line (BEOL) which may be advantageous in one or more embodiments. The designation BEOL applies to that portion of fabrication of a semiconductor circuit, such as an integrated circuit (IC) where individual devices are interconnected, e.g., by using conductive, metal interconnects such as copper or aluminum interconnects.

FIG. 7 is exemplary of a fan-out from a separation or pitch 3' in individual elements in the waveguide 400, e.g., a silicon chip, to a pitch 3" in the waveguide 500, e.g., an optical fiber(s). The Mode Field Diameter may be designed in order to match the waveguide 500. In one or more embodiments, the pitch 3" of the, e.g., fibers in the V-groove block tip may be substantially of 250 micron (1 micron=$10^{-6}$ m).

By referring, for instance, to a adiabatic coupling layout as exemplified, e.g., in FIG. 3, the exemplary (cross-sectional) representation of FIG. 6 shows a waveguide (e.g., a SiN waveguide) 400 having a core 40 which extends at the bottom of a cavity 1004 where an, e.g., glass waveguide (e.g., a glass waveguide 300 as discussed previously) can be inserted. Such a waveguide is schematically shown in FIG. 6 in phantom lines.

In one or more embodiments the cavity 1004 may be provided by an etching step through the BEOL structure (indicated as a whole as 1008) down to a planar surface 1004a in the oxide above the core 40. A thin oxide layer 40a may thus be present between the core 40 and the planar surface 1004a. Due to its reduced thickness (e.g., 50 nm–1 nm=$10^{-9}$ m) the oxide layer will not be obtrusive to coupling.

The waveguide 300 may be positioned in the cavity and the waveguide core 30 may be optically coupled to the core 40 of the waveguide 400. More particularly, the waveguide 300 may be positioned in the cavity 1004 such that the second portion 30b of the waveguide core 30 is at or near the planar surface 1004a of the cavity 1004. The second portion 30b of the waveguide core 30 is at or near the surface of the waveguide 300, which facilitates adiabatic coupling between the waveguide core 30 and the core 40. In some embodiments, the second portion 30b may be "exposed", i.e., at or near the surface of the waveguide 300, over a length of about 3 mm, which may correspond with a length of the cavity 1004.

FIG. 7 shows respective portions of the waveguide cores 30 being positioned over the waveguide 400 (e.g., in the cavity 1004). The S-shaped waveguide cores 30 may transition from the second portions 30b (e.g., at or near the surface of the waveguide 300) to the first or "buried" portions 30a (e.g., positioned centrally within the waveguide body) in a transition region between the waveguide 400 and a "fan out" region where the waveguide cores 30 fan out as shown in FIG. 7.

One or more embodiments may offer the advantage of exploiting an established fabrication technology, e.g., ion exchange waveguides, with an S-bend incorporating a single, e.g., rectangular block which may be assembled on a silicon chip without using complicated tools to produce a bend in a waveguide.

It will be otherwise appreciated that while achieving good result may be facilitated by resorting to ion exchange technology the embodiments are not limited to such technology.

One or more embodiments may adopt other technologies: direct write technology in glass or in polymer may be exemplary of one such alternative technology.

For instance, in one or more embodiments the waveguide core (e.g., 30) can be three-dimensionally (3D) written in a glass or polymer waveguide body by using laser direct write technology.

Also, in one or more embodiments, planar (2D) waveguides can be fabricated on separate (e.g., glass) wafers which can then be stacked (and diced) to produce a 3D waveguide, possibly including multiple channels.

One or more embodiments may thus relate to an optical waveguide (e.g., 300) including a waveguide body (e.g., 32) and a waveguide core (e.g., 30) for optical radiation to propagate therealong, wherein the waveguide core includes:
- a body portion (e.g., a "buried" portion 30a) extending within the waveguide body,
- a coupling portion (e.g., a "surface" portion 30b) extending at the surface of the waveguide body, and
- an S-bent intermediate portion (e.g., 30c) between the body portion and the coupling portion.

In one or more embodiments an optical coupling arrangement may include:
- a first optical waveguide (e.g., 300), the first optical waveguide including a optical waveguide according to one or more embodiments,
- a second optical waveguide (e.g., 400, such as a silicon photonics device) including a respective waveguide body (e.g., 42, 44) and at least one waveguide (e.g., 40, 401, 402) at the surface of the respective waveguide body (42, 44), the second optical waveguide coupled with the first optical waveguide with the at least one waveguide facing the coupling portion of the first optical waveguide.

In one or more embodiments, said respective waveguide body may include an end edge (e.g., 42a), wherein the body portion and the coupling portion of the waveguide core of the first optical waveguide lie on opposite sides of said end edge (that is with the S-bent portion starting "before" the end edge).

In one or more embodiments, said respective waveguide body may include an end edge (e.g., 42a), wherein the S-bent intermediate portion is at a distance (see, e.g., D in FIGS. 3 and 4) from said respective waveguide body (see, e.g., 42) at said end edge (42a), that distance optionally selected such that no appreciable amount of electromagnetic radiation as conveyed at the S-bent intermediate portion is "in contact" with the waveguide (e.g., chip) body at said end edge (42a).

In one or more embodiments, the second optical waveguide may include:
- a first waveguide member (e.g., 401) at the surface of the respective waveguide body, the second optical waveguide coupled with the first optical waveguide with the first waveguide member facing the coupling portion of the first optical waveguide to provide a coupling interface (e.g., B1) with the first optical waveguide, and
- a second waveguide member (e.g., 402) including a portion facing the first waveguide member to provide a further coupling interface (e.g., A1) between the first waveguide member and the second waveguide member, with the first waveguide member between the second waveguide member and the coupling portion of the first optical waveguide.

In one or more embodiments:
- the at least one waveguide member of the second optical waveguide may include at least one of a SiN and a Si waveguide member and/or
- the second optical waveguide may include a silicon substrate carrying the at least one waveguide member.

In one or more embodiments said first and second waveguide members may include SiN and Si waveguide members, respectively.

In one or more embodiments the body portion of the waveguide core of the first waveguide may have an end portion opposite said coupling portion, said end portion coupled, optionally butt coupled (e.g., 504) with an optical fiber (e.g., 500, 50).

Electronic apparatus (see, e.g., the BEOL 1008 of FIG. 6) including an optical coupling arrangement according to one or more embodiments.

In one or more embodiments, for example as previously described herein with respect to FIG. 6, such electronic apparatus may include an etched reception cavity (e.g., 1004) of said first optical waveguide, said etched reception cavity having a planar bottom surface (e.g., 1004a) the at least one waveguide member of the second optical waveguide extending in proximity of said planar bottom surface with a (thin) insulating layer between the at least one waveguide member and the planar bottom surface.

A method of fabricating an optical waveguide according to one or more embodiments may include one of:
 ion exchange technology applied to a glass waveguide body (e.g., GW in FIGS. 2A and 2B),
 writing said waveguide core by means of write technology applied to a glass or polymer waveguide body.

In one or more embodiments said fabricating an optical waveguide by ion exchange technology may include:
 providing a glass waveguide body (e.g., GW),
 selectively (e.g., via a mask M) diffusing ions (e.g., ID) at the surface of said waveguide body,
 applying an electrical field (e.g., F) to said glass waveguide body with said selectively diffused ions and facilitating displacement of said ions into said waveguide body to form said body portion extending within the waveguide body and said S-bent intermediate portion coupling the body portion and the coupling portion.

LIST OF DOCUMENTS CITED

[1] Chiaretti, C. Towards the Industrial Deployment of the Silicon Photonics Technology, Proc. of the IEEE Bipolar/BiCMOS Circuits and Technology Meeting, 2013.
[2] Narasimha et al., An Ultra Low Power CMOS Photonics Technology Platform for H/S Optoelectronic Transceivers at less than $1 per Gbps, OFC, 2010.
[3] Wesley D. Sacher, Ying Huang, Liang Ding, Benjamin J. F. Taylor, Hasitha Jayatilleka, Guo-Qiang Lo, and Joyce K. S. Poon, Wide bandwidth and high coupling efficiency Si3N4-on-SOI dual-level grating coupler, Optical Society of America, 2014.
[4] Tymon Barwicz, Yoichi Taira, Low-Cost Interfacing of Fibers to Nanophotonic Waveguides: Design for Fabrication and Assembly Tolerances, IEEE Photonics Journal, 2014.
[5] Nicolas Boyer, Alexander Janta-Polczynski, Jean-Francois Morissette, Swetha Kamlapurkar, Sebastian Engelmann, Yoichi Taira, Shotaro Takenobu, Hidetoshi Numata, Paul Fortier and Tymon Barwicz, Sub-Micron Bondline-Shape Control in Automated Assembly of Photonic Devices, IEEE, 2016.
[6] Giannis POULOPOULOS, Dimitrios KALAVROUZIOTIS, John R. MACDONALD, Paul MITCHELL, Nicholas PSAILA, Joek TUIN, Rutger SMINK, Sander DORRESTEIN, Michiel VAN RIJNBACH, Jeroen DUIS, Hercules AVRAMOPOULOS, Angled 3D Glass-to-SiPh adiabatic coupler, ECIO2016, 18TH EUROPEAN CONFERENCE ON INTEGRATED OPTICS.

Without prejudice to the underlying principles, the details and embodiments may vary, even significantly, with respect to what has been disclosed by way of example only, without departing from the extent of protection.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A device, comprising:
 a first optical waveguide including:
  a first waveguide body having a first surface; and
  a waveguide core that includes:
   a first portion extending within the first waveguide body along a first axis;
   a second portion at the first surface of the first waveguide body, the second portion extending within the first waveguide body along a second axis that is closer to the first surface of the first waveguide body than the first axis; and
   an intermediate portion between the first portion and the second portion;
 a second optical waveguide including:
  a second waveguide body having a second surface; and
  a waveguide member adjacent the second surface of the second waveguide body, the waveguide member of the second optical waveguide being adiabatically coupled with the second portion of the first optical waveguide; and
 a semiconductor circuit structure including an etched reception cavity having a planar bottom surface, the second optical waveguide being formed in the semiconductor circuit structure with the waveguide member of the second optical waveguide extending adjacent to the tartar bottom surface with an insulating layer between the waveguide member and the planar bottom surface, the first optical waveguide being positioned in the etched reception cavity.
2. The device of claim 1 wherein the intermediate portion is S-shaped.
3. The device of claim 1 wherein the S-shaped intermediate portion includes a first curve having a first orientation of curvature, and a second curve having a second orientation of curvature that is opposite the first orientation of curvature.
4. The device of claim 1 wherein the first portion is a body portion and the second portion is a coupling portion, the coupling portion being configured to optically couple the optical waveguide to the second optical waveguide.
5. The device of claim 1 wherein the first axis and the second axis are substantially parallel to each other.

6. The device of claim 1 wherein the second optical waveguide includes a second waveguide member including a portion aligned with the first waveguide member, with the first waveguide member being between the second waveguide member and the second portion of the first optical waveguide, and
wherein the second waveguide member of the second optical waveguide is spaced apart from the first waveguide member of the second optical waveguide by a portion of the second body.

7. A system, comprising:
a first optical waveguide including:
a first body; and
a core, the first body having a first surface, the core including:
a first portion extending within the first body along a first axis;
a second portion extending within the first body along a second axis, the second axis being closer to the first surface of the body than the first axis; and
an intermediate portion between the first portion and the second portion;
a second optical waveguide including:
a second body having a second surface;
a first waveguide member adjacent the second surface of the second body, the first waveguide member of the second optical waveguide being adiabatically coupled with the second portion of the first optical waveguide; and
a second waveguide member including a portion aligned with the first waveguide member, with the first waveguide member being between the second waveguide member and the second portion of the first optical waveguide,
wherein the second waveguide member of the second optical waveguide is spaced apart from the first waveguide member of the second optical waveguide by a portion of the second body.

8. The system of claim 7 wherein the first waveguide member of the second optical waveguide extends along the second surface of the second body.

9. The system of claim 7 wherein the first waveguide member of the second optical waveguide is spaced apart from the second surface.

10. The system of claim 9, wherein said first and second waveguide members include SiN and Si waveguide members, respectively.

11. The system of claim 7 wherein the second body includes an end edge, the first portion and the second portion of the core of the first optical waveguide are on opposite sides of the end edge.

12. The system of claim 7 wherein the second body includes an end edge, the intermediate portion being at a distance from the second body at the end edge.

13. The system of claim 7, further comprising an epoxy layer between the first waveguide member of the second optical waveguide and the second portion of the first optical waveguide.

14. The system of claim 7, wherein:
the first waveguide member of the second optical waveguide includes at least one of a SiN or a Si waveguide member.

15. The system of claim 7, wherein the second optical waveguide includes a silicon substrate having the first waveguide member.

16. The system of claim 7, further comprising:
an optical fiber, the first body portion of the waveguide core of the first waveguide includes an end portion opposite the second portion, the end portion coupled to the optical fiber.

17. The system of claim 7, further comprising a semiconductor circuit structure including an etched reception cavity having a planar bottom surface, the second optical waveguide being formed in the semiconductor circuit structure with the first waveguide member of the second optical waveguide extending adjacent to said planar bottom surface with an insulating layer between the first waveguide member and the planar bottom surface, the first optical waveguide being positioned in the etched reception cavity.

18. A device, comprising:
a first optical waveguide, including:
a first waveguide body having a first surface, the first waveguide body having a first refractive index;
a waveguide core having a second refractive index that is different from the first refractive index, the waveguide core including:
a first straight portion extending within the first waveguide body along a first axis;
a second straight portion at the first surface of the first waveguide body and extending within the first waveguide body along a second axis that is closer to the first surface of the first waveguide body than the first axis; and
a curved intermediate portion extending between and connected to the first straight portion and the second straight portion;
a second optical waveguide, including:
a second waveguide body having a second surface; and
a waveguide member adjacent the second surface of the second waveguide body, the waveguide member of the second optical waveguide being adiabatically coupled with the second portion of the first optical waveguide; and
a semiconductor circuit structure including an etched reception cavity having a planar bottom surface, the second optical waveguide being formed in the semiconductor circuit structure with the waveguide member of the second optical waveguide extending adjacent to the planar bottom surface with an insulating layer between the waveguide member and the planar bottom surface, the first optical waveguide being positioned in the etched reception cavity.

19. The device of claim 18 wherein the first waveguide body and the waveguide core include glass, the waveguide core having an ion concentration that is greater than an ion concentration of the first waveguide body.

20. The device of claim 18 wherein the second optical waveguide includes a second waveguide member including a portion aligned with the first waveguide member, with the first waveguide member being between the second waveguide member and the second portion of the first optical waveguide, and
wherein the second waveguide member of the second optical waveguide is spaced apart from the first waveguide member of the second optical waveguide by a portion of the second body.

* * * * *

UNITED STATES PATENT AND TRADEMARK OFFICE
CERTIFICATE OF CORRECTION

PATENT NO. : 10,802,215 B2
APPLICATION NO. : 15/921374
DATED : October 13, 2020
INVENTOR(S) : Mark Andrew Shaw Page 1 of 1

It is certified that error appears in the above-identified patent and that said Letters Patent is hereby corrected as shown below:

In the Claims

Column 10, Line 52: Claim 1:
"the tartar bottom surface with an insulating layer" should read, --the planar bottom surface with an insulating layer--.

Signed and Sealed this
Eighth Day of December, 2020

Andrei Iancu
*Director of the United States Patent and Trademark Office*